(12) United States Patent
Lee et al.

(10) Patent No.: US 6,282,331 B1
(45) Date of Patent: Aug. 28, 2001

(54) APPARATUS OF ALIGNMENT FOR SCANNER AND A METHOD OF THE SAME

(75) Inventors: Wayne Lee, Miao Li; Jenn-Tsair Tsai, Pa Li Hsiang; Hsi-Min Chen, Hsinchu, all of (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/662,833

(22) Filed: Sep. 15, 2000

Related U.S. Application Data

(63) Continuation of application No. 08/971,420, filed on Nov. 17, 1997.

(51) Int. Cl.$^7$ .................................................... G06K 7/00
(52) U.S. Cl. ............................................................ 382/312
(58) Field of Search ................................... 382/287, 288, 382/289, 291, 292, 312, 317, 318; 358/406, 494, 497, 486, 474, 488

(56) References Cited

U.S. PATENT DOCUMENTS

| | | |
|---|---|---|
| 3,852,573 | 12/1974 | Dulch . |
| 5,477,057 | 12/1995 | Angeley et al. . |
| 5,500,516 | 3/1996 | Durbin . |
| 5,513,275 | 4/1996 | Khalaj et al. . |
| 5,539,532 | 7/1996 | Watanabe . |
| 5,600,432 | 2/1997 | Lengyel . |
| 5,796,114 | 8/1998 | Mizutani . |
| 5,939,708 | 8/1999 | Tsai . |

Primary Examiner—Andrew W. Johns
Assistant Examiner—Seyed Azarian
(74) Attorney, Agent, or Firm—Lowe Hauptman Gilman & Berner, LLP

(57) ABSTRACT

An alignment pad is set in front of the image sensor. A lens is set between the alignment pad and the image sensor. The alignment pad includes a set of boundary alignment patterns. At least one sets of resolution analysis patterns are formed on the alignment pad. Each set of the resolution analysis pattern includes a horizontal analysis resolution pattern and a vertical resolution analysis pattern. The horizontal analysis resolution pattern is consisted of a plurality of vertical lines to analyze the horizontal resolution of the lens. The vertical resolution analysis pattern is consisted of a plurality of oblique lines to analyze the vertical resolution of the lens. The signals detected by the image sensor is fed to an application specific integrated circuits (ASIC) to generate a collation data. Subsequently, the collation data is fed into a buffer to store the data. A computer is responsive to these signal, and displays the collation data on the monitor in gray mode for collation.

10 Claims, 3 Drawing Sheets

APPARATUS OF ALIGNMENT FOR SCANNER AND A METHOD OF THE SAME

This application is a Continuation of application Ser. No. 08/971,420 filed Nov. 17, 1997.

FIELD OF THE INVENTION

The present invention relates to a method of alignment, adjustment for a scanning system, and more specifically, to an adjustment, alignment apparatus and method for a CCD, lens used in scanning system.

BACKGROUND OF THE INVENTION

Conventional scanning system can be approximately divided into two segments that are handy scanning system and flat-bed scanning system. A scanning system makes use of focusing a reflecting light beam through a photo detector to generate an image signal for further image processing. A conventional scanning system apparatus includes a light source, a mirror, and a lens set, which are used to guide the reflecting light to a charge couple device (CCD). The charge couple device is utilized to generate an image signal. Typically, image capture is achieved by passing the document in front of a device known as a CCD. This consists of a large of very small, individual semiconductor receptors, disposed in a linear array. The document is passed in front of the CCD and a complete image of the document linear segments individually captured from the CCD. A preprocessing element is used to respond an image signal and adjust dc gain of the image signal. An analogue to digital converter is used to convert adjusted image signal to a digital signal and a post-processing element to generate an image code by processing said digital signal through highlight, shadow, and Gamma correction.

Alignment is an important step for setting up a scanning system. In general, it needs an alignment pad 10 for the alignment, as shown in FIG. 1. The alignment pad 10 includes a set of black patterns 12 for boundary alignment. The boundary alignment is used to determine whether the area scanned by a CCD is in desired area or not. The height of the alignment pad 10 is used for horizontal alignment. The horizontal alignment can determine whether the line scanned by the CCD is horizontal or not. The resolution of a lens is determined by a plurality of vertical lines 14 on the alignment pad 10. The alignment signals is responsive to an oscilloscope, and the signals are displayed, analyzed on it. However, it is very hard to achieve exact results of the CCD and the lens by analyzing the alignment signal on the oscilloscope. By using the conventional alignment method, the horizontal resolution, vertical resolution, and magnifying power of the lens can not be achieve. Further, the boundary alignment and the resolution analysis can not be done at the same time. Thus, it is a hard task to align the CCD, lens by using the conventional method.

Therefore, what is required is a method for alignment the CCD and lens for a scanning system.

SUMMARY OF THE INVENTION

A scanning system includes an image sensor for capturing the image of an object. An alignment pad is set in front of the image sensor. A lens is set between the alignment pad and the image sensor. The alignment pad includes a set of boundary alignment patterns that are respectively formed adjacent to the two terminals of the alignment pad. At least one sets, preferably three sets, of resolution analysis patterns are formed on the alignment pad. The resolution analysis pattern is used to determine the resolution of the lens. Each set of the resolution analysis pattern includes a horizontal analysis resolution pattern and a vertical resolution analysis pattern. The horizontal analysis resolution pattern is consisted of a plurality of vertical lines to analyze the horizontal resolution of the lens. Each line is spaced with an equal distance. The vertical resolution analysis pattern is consisted of a plurality of oblique lines to analyze the vertical resolution of the lens. Preferably, the oblique lines are tilted with an angle about 5 to 10 degrees respective to the vertical lines.

The signals detected by the image sensor is fed to an application specific integrated circuits (ASIC) to generate a collation data. Subsequently, the collation data is fed into a buffer to store the data. The data is responsive to a computer for further processing the data. The processed data is then displayed on a monitor of the computer. The computer is responsive to these signal, and displays the collation data on the monitor in gray mode for collation. The data shown on the monitor is divided into three major portions. A first data portion relates to the resolution of the lens. A second data portion includes the collation signals according to the boundary alignment pattern. A third data potion is used to show valves about the resolutions of the lens.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
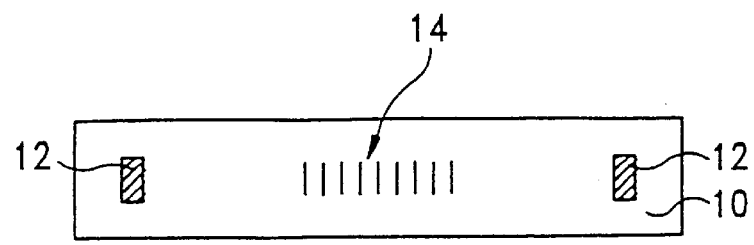
FIG. 1 is a schematic drawing of an alignment pad according to the prior art.
Figure 2A:
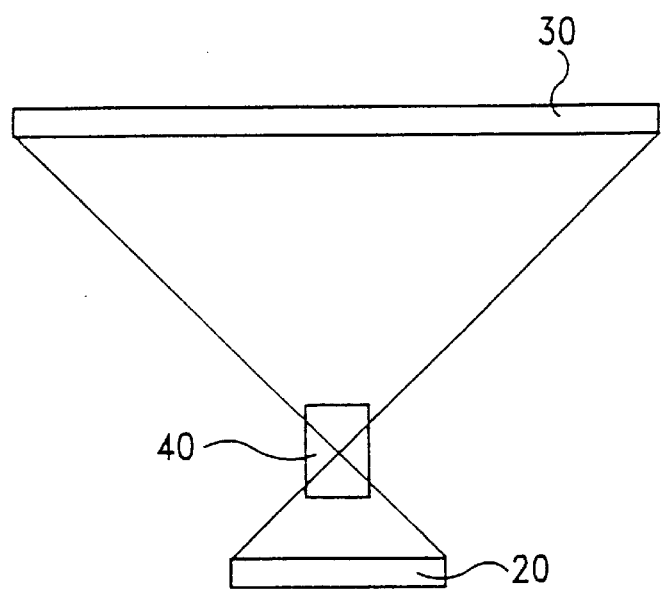
FIG. 2A is a schematic drawing of an alignment arrangement according to the present invention.
Figure 2B:
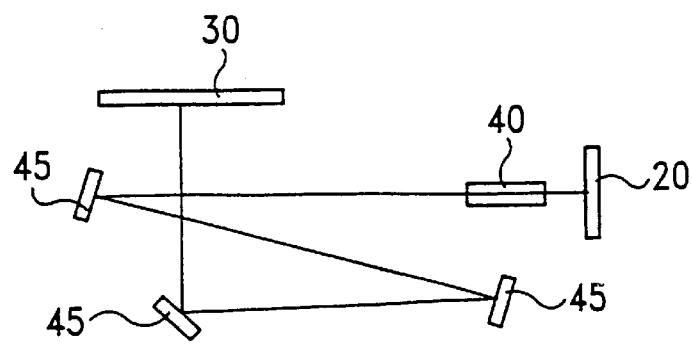
FIG. 2B is a schematic drawing of another alignment arrangement according to the present invention.

The present invention discloses an alignment method of a CCD, and lens resolution analysis for a scanning system. The description of the present invention will be seen as follows. Turning to FIG. 2A, a scanning system includes an image sensor, such as CCD or CIS for capturing the image of an object, for example a document. In an embodiment, an image sensor 20 is set in a scanning system. An alignment pad 30 is set in front of the image sensor 20. The position where the alignment pad 30 located is used for placing the document when the document is fed into the scanning system for scanning. A lens 40 is set between the alignment pad 30 and the image sensor 20. Further, the alignment pad 30 may not be set in front of the image sensor 20, as shown in FIG. 2B. The image of the alignment pad 30 can be responsive to the image sensor 20 by a plurality of mirrors 45. It is well known in the art. Thus, it will not be described in detail herein.

Figure 3:
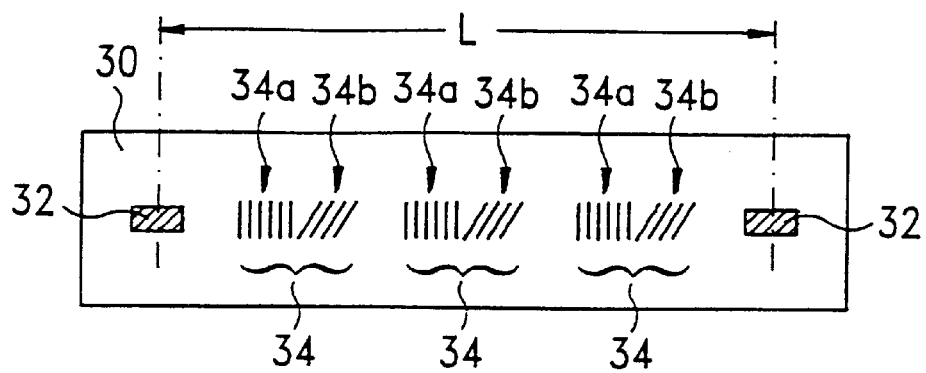
FIG. 3 is a schematic drawing of an alignment pad according to the present invention.

In order to describe the present invention in detail, the pattern of the alignment pad 30 is shown in FIG. 3. The alignment pad 30 includes a set of boundary alignment patterns 32 that are respectively formed at adjacent to the two terminals of the alignment pad 30. The boundary alignment patterns 32 are used to make sure that the area scanned by the scanner is in the desired area. The color of the boundary alignment patterns 32 have to be different from the neighboring area. For, example, the color of the boundary alignment patterns 32 are white, then the alignment pad 30 can be black. Alternatively, the colors of the boundary alignment patterns 32, alignment pad 30 are respectively black and white. It has to be note that any suitable color can be used for alignment pad 30 and the boundary alignment patterns 32. It is not limited to black and white. This arrangement is mainly to generate signal peaks on M, the image sensor 20 is at suitable position or not can be recognition by the signal peaks. The shape of the alignment patterns 32 can be rectangular, square orany suitable shape.

At least one sets, preferably three sets, of resolution analysis patterns 34 are formed on the alignment pad 30. A first set of the resolution analysis patterns 34 is located at the central portion of the alignment pattern 30. A second, a third sets resolution analysis patterns 34 are respectively formed at the right, left sides of the first set of the resolution analysis patterns 34, and adjacent to the boundary alignment pattern 32. In addition, the second, the third sets resolution analysis patterns 34 are located at adjacent to the set of boundary alignment patterns 32, respectively.

The reflecting light beam of the first set resolution analysis pattern 34 is focused by the lens 40. Then, the focused light beam is fed to the image sensor 20 to generate an image signal. The signal can be used to analyze the resolution of the lens 40. It means that the first set resolution analysis pattern 34 can be used to determine the resolution of the lens 40 while the light source scans at the central portion of the alignment pad 30 (or scanned object). Similarly, the second and third sets of the resolution analysis patterns 34 are respectively used to analyze the resolution of the lens 40 when light source scans at right, left portions of a scanned object.

Each set of the resolution analysis pattern 34 includes a horizontal resolution (X resolution) analysis pattern 34a and a vertical resolution (Y resolution) analysis pattern 34b. The X resolution analysis pattern 34a is consisted of a plurality of vertical lines to analyze the horizontal resolution (X resolution) of the lens 40. Each line is spaced with an equal distance. The space between the lines depends on the resolution that the designer desired. The resolution signal reflected from the resolution analysis pattern 34 can be responsive to a monitor of a computer and be transferred to a gray mode by using MTF (modulation transfer function). The Y resolution analysis pattern 34b is consisted of a plurality of oblique lines to analyze the vertical resolution (Y resolution) of the lens 40. Preferably, the oblique lines are tilted with an angle about 5 to 10 degrees respective to the vertical lines. The more angle the oblique line is titled, the higher resolution of the Y resolution and lower resolution of X resolution are. Therefore, the oblique lines can be used to represent how high the Y resolution is.

Further, the second and the third sets of the resolution analysis pattern 34 can provide another benefit, which will be described as follows. The image sensor 20 may not be orthogonal to the lens 40 with each other before the setting up of the scanner is completed,. Thus, the resolution of the second and the third sets of the resolution analysis pattern 34 can be used to determine whether the image sensor 20 is orthogonal to the lens 40 or not. If the resolutions of the second and the third sets of the resolution analysis pattern 34 are the same. It means that the image sensor 20 is orthogonal to the lens 40, otherwise they are not orthogonal with each other. From the resolution shifts between the three sets of resolution analysis pattern 34, an operator can conclude how to align the image sensor 20 or the lens set 40.

In addition, the magnifying power (m) of the lens 40 can be determined using the X, Y resolutions of the resolution analysis pattern 34. As well known in the art, the numbers of the pixels A in theory can be determined by using the distance L between the second, third sets of the resolution analysis pattern 34. Assume that the real pixels number scanned by the image sensor 20 is B. Then, the magnifying power (m) of the lens 40 is determined by the following formula:

$$m=1-(A-B)/A.$$

Figure 4:
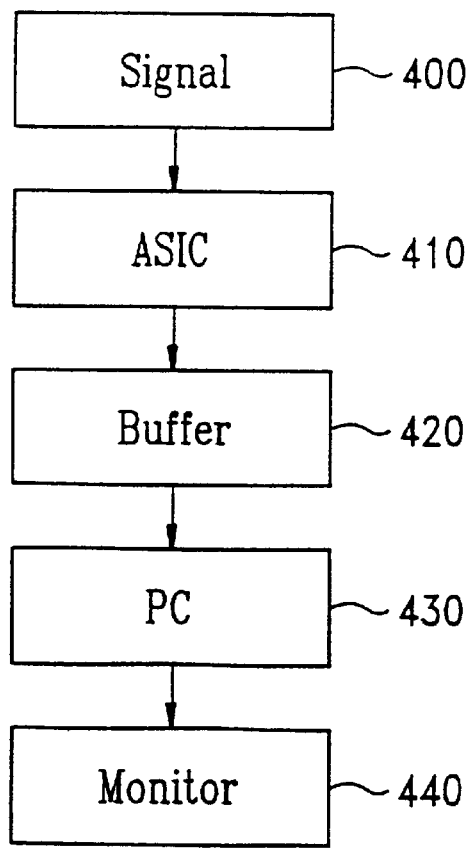
FIG. 4 is a flow chart of an alignment method according to the present invention

Turning to FIG. 4, it shows a flow chart according to a method of the present invention. The signals detected by the image sensor 400 is fed to an application specific integrated circuits (ASIC) 410 to generate a collation data. Subsequently, the collation data is fed into a buffer 420 to store the data. The data is responsive to a computer 430 for further processing the data. It is well known to a person skilled in the art. The processed data is then displayed on a displayer 440, such as a monitor of the computer 430.

Figure 5:
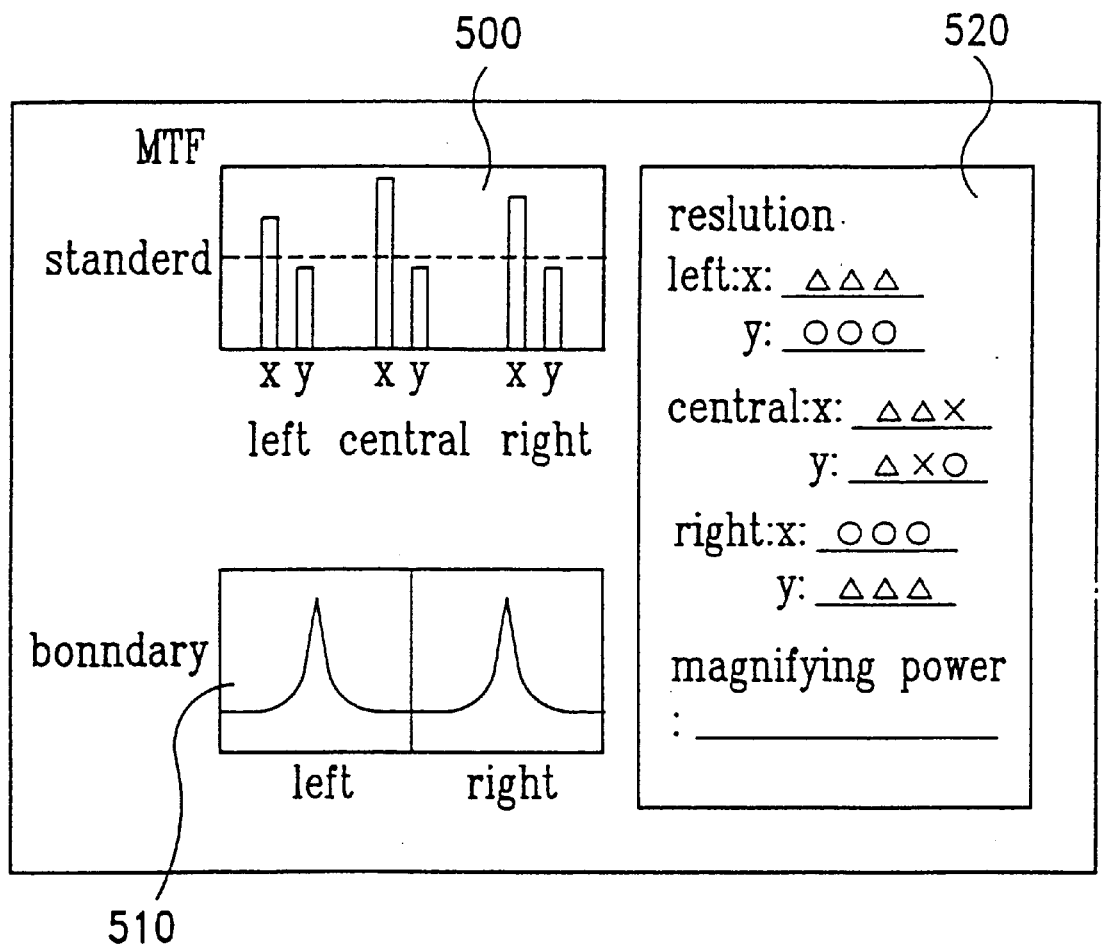
FIG. 5 is the collation data shown on a monitor according to the present invention.

The computer 430 is responsive to these signal, and displays the collation data on the monitor 440 in gray mode for collation. In order to adjust and collect the collation data, the image of the alignment patterns scanned by the image sensor 400 are displayed on the monitor as shown in FIG. 5. The data shown on the monitor is divided into three major portions 500, 510 and 520. A first data portion 500 relates to the resolution of the lens 40. The resolutions of the three sets of resolution analysis pattern 34 are displayed one by one. For example, the resolution can be represented by a bar diagram or the like shown on the monitor. The resolutions of the central, left and right portions of the alignment pad are shown in the first data portion 510. A second data portion 510 includes the collation signals according to the boundary alignment pattern 32. Typically, if the area scanned by the image sensor is in the desired area (it means that scanned objected can be completely scanned by the image sensor), then alignment peaks 512 will be respectively generated on the monitor. It is because that the color of the boundary alignment pattern 32 is different from that of alignment pad 30 or the area adjacent to the boundary alignment pattern 32. A third data potion 520 is used to show valves about the resolutions of the lens, the magnifying power of the lens and so on.

The alignments of the lens and image sensor are very simple than the prior art. The lens's resolutions are shown on a monitor, and represented by diagrams and valve. It is very convenes as references for operator to align the image sensor and the lens. Further, the lens's resolution and boundary alignment signals can be shown on a monitor at the same time by using the present method and apparatus.

The foregoing description of the present invention has been presented for purposes of illustration and description. As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus of alignment for a scanning system, comprising:
    an image sensor;
    an alignment pad set in front of said image sensor for aligning said image sensor;
    a lens set between said image sensor and said alignment pad;
    a first set of alignment patterns formed in said alignment pad, wherein said alignment patterns includes a first analysis pattern and a second analysis pattern, said first analysis pattern including a plurality of parallel vertical lines for analyzing a horizontal resolution of said scanning system, vertical lines parallel to each other with a predetermined distance, said second analysis pattern including a plurality of oblique lines for analyzing a vertical resolution of said scanning system essentially, titled with a predetermined degree to said vertical lines, said oblique lines parallel to each other;
    a second set of alignment patterns formed in said alignment pad, compared with said first set of alignment patterns in generated signals of said image sensor, for determining orthogonality of said image sensor and said lens, wherein said second set of alignment patterns includes a third analysis pattern and a fourth analysis pattern, said third analysis pattern same as said first analysis pattern, said fourth analysis pattern same as said second analysis pattern;
    an application specific integrated circuit responsive to said signals generated by said image sensor;
    a buffer connected to said application specific integrated circuit to store said signals;
    a computer connected to said buffer to process said signals; and
    a display connected to said computer to display said signals for representing the alignment results.

2. The apparatus of claim 1, wherein said predetermined degree is tilted within five to ten degrees.

3. The apparatus of claim 1, further comprising a set of boundary patterns formed adjacent to both terminals of said alignment pad for analyzing the shift of the scanned area.

4. An alignment pad of a scanning system, comprising:
    a first set of alignment patterns formed in said alignment pad, wherein said alignment patterns includes a first analysis pattern and a second analysis pattern, said first analysis pattern including a plurality of parallel vertical lines for analyzing a horizontal resolution of said scanning system, vertical lines parallel to each other with a predetermined distance, said second analysis pattern including a plurality of oblique lines for analyzing a vertical resolution of said scanning system essentially, titled with a predetermined degree to said vertical lines, said oblique lines parallel to each other; and
    a second set of alignment patterns formed in said alignment pad, compared with said first set of alignment patterns in generated signals of said image sensor, for determining orthogonality of said image sensor and said lens, wherein said second set of alignment patterns includes a third analysis pattern and a fourth analysis pattern, said third analysis pattern same as said first analysis pattern, said fourth analysis pattern same as said second analysis pattern.

5. The apparatus of claim 4, wherein said degree of said oblique line is tilted within five to ten degrees.

6. The apparatus of claim 4, further comprising a set of boundary patterns formed adjacent to both terminals of said alignment pad for analyzing the shift of the scanned area.

7. The apparatus of claim 4, wherein said first set of the alignment patterns is adjacent to said second set of the alignment patterns.

8. A method of alignment for adjusting a scanning system, comprising the steps of:
    setting an alignment pad in front of an image sensor wherein said alignment pad having at least a first set of alignment patterns formed including a first analysis pattern and a second analysis pattern, said first analysis pattern including a plurality of parallel vertical lines with a predetermined distance, said second analysis pattern including a plurality of parallel oblique lines titled with a predetermined degree to said vertical lines and a second set of alignment patterns having a third analysis pattern and a fourth analysis pattern, said third analysis pattern same as said first analysis pattern, said fourth analysis pattern same as said second analysis pattern;
    placing a lens between said alignment pad and said image sensor; and
    generating image signals of said alignment pad from said image sensor.

9. The apparatus of claim 8, wherein said predetermined degree of said oblique line is tilted within five to ten degrees.

10. The apparatus of claim 8, further comprising a set of boundary patterns formed adjacent to both terminals of said alignment pad for analyzing the shift of the scanned area.

* * * * *